United States Patent [19]

Kouhia

[11] Patent Number: 4,985,602

[45] Date of Patent: Jan. 15, 1991

[54] SELF-LOCKING SUPPORT FOR DIGITIZER COVER

[75] Inventor: Kenneth Kouhia, Danbury, Conn.

[73] Assignee: Summagraphics Corporation, Seymour, Conn.

[21] Appl. No.: 379,050

[22] Filed: Jul. 13, 1989

[51] Int. Cl.$^5$ .............................................. G08C 21/00
[52] U.S. Cl. .......................................... 178/18; 108/9; 108/23; 362/97
[58] Field of Search .................. 178/18, 19, 20; 108/6, 108/7, 9, 23, 36, 38; 362/97, 282

[56] References Cited

U.S. PATENT DOCUMENTS 4,592,285 6/1986 Egli ..................................... 108/23 X
4,733,485 3/1988 Ozeki ................................... 362/97 X Primary Examiner—Stafford D. Schreyer
Attorney, Agent, or Firm—Rosen, Dainow & Jacobs

[57] ABSTRACT

A digitizer tablet is disclosed having a movable cover and a support which automatically stably holds the cover open when the cover is opened. The digitizer tablet comprises a base structure, a cover pivotably connected thereto and a support coupled to the cover and to the base structure for automatically holding the cover open when it has been pivoted to its open position. The support is constructed to self engage in the open position such that the application of a substantial force to the support is required to unlock it from the open position. Preferably, the support includes a spring resiliently urging the support to self engage in the open position. The support comprises a first support arm pivotally connected at one end to the cover and a second support arm pivotally connected at one end to the base structure, the first and second support arms each including an opposite end which are pivoted together. The cover is automatically held open once opened by the configuration of the arms and by a stop limiting pivoting of the first and second arms relative to each other to a predetermined angle.

22 Claims, 2 Drawing Sheets

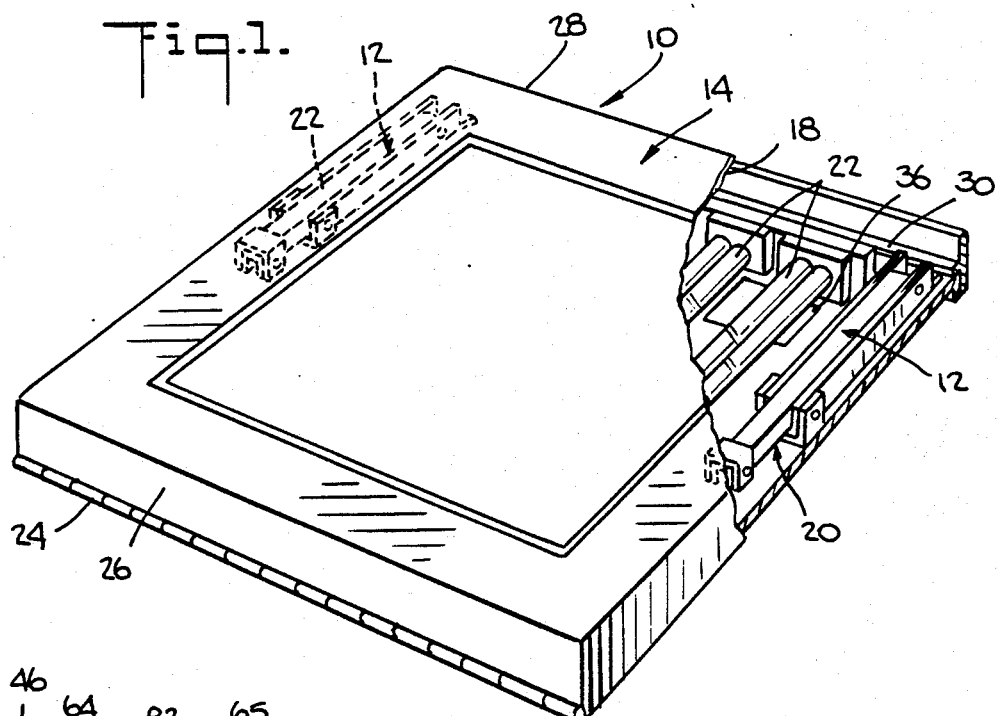
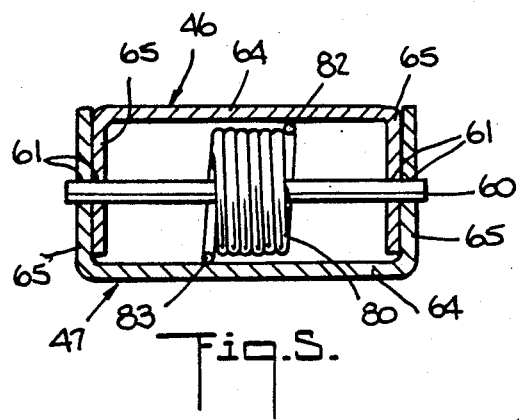
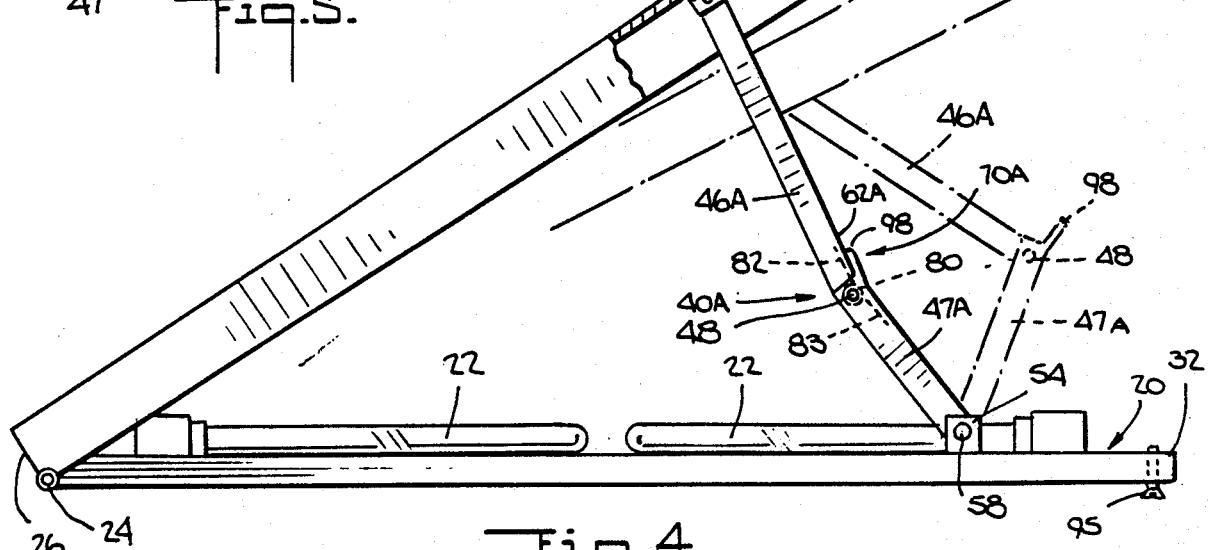

SELF-LOCKING SUPPORT FOR DIGITIZER COVER

BACKGROUND OF THE INVENTION

The present invention relates to digitizer tablets having a movable cover. More particularly, the invention relates to a digitizer tablet having a hinged cover, especially a back-lighted digitizer tablet, and a support for holding the cover open.

A digitizer includes a tablet and a cursor or stylus and provides digitized signals to a computer which represent the position of the cursor or stylus on a digitizing surface of the tablet. Typically, digitizers are used with a computer to input to the computer digitized signals representing graphics, drawings, etc., or menu selection, etc. The tablet includes a grid or electrode structure adjacent the digitizing surface which interacts with the cursor or stylus as it is moved on or in close proximity to the digitizing surface. The tablet typically encloses circuitry that determines the position of the cursor or stylus relative to the digitizing surface and includes a connector for connecting the tablet to a computer.

Back-lighted digitizer tablets are particularly suitable for accurate tracing of drawings, semiconductor layouts, circuit diagrams, etc., and include structure for back-lighting the digitizing surface, somewhat in the nature of a light box. Back-lighting facilitates tracing of graphics, drawings, indicia, etc. for input to a computer from a sheet placed on the back-lighted digitizing surface using the cursor or stylus and a graphics or CAD application program loaded into the computer.

Typically, the grid or electrode structure of a back-lighted digitizer tablet is enclosed by the cover and associated structure while the lighting apparatus is disposed in a base structure, and the cover is connected to the base structure in a manner which facilitates moving the cover relative to the base structure for gaining access to the lighting apparatus for servicing it, for example for light element replacement.

A current back-lighted digitizer tablet includes a hinged cover which permits the cover to be pivoted open relative to the base structure. A single support rod used to hold the cover open is stored within the closed digitizer tablet. The support rod is pivoted at one end to the base structure and is simply swung vertically to engage and support the cover which is simply rested on the distal tip of the support rod, or vice verse. Since the rod is not attached to both the cover and the base structure and simply engages one of them due to gravity, the cover is not stably held in the open position and may easily be jarred loose and fall while a light element is being changed. If that should occur, it is possible to damage the digitizer tablet. Moreover, since the rod must manually be moved into position, there is the possibility that an operator may incorrectly position the rod which may lead to the cover falling.

Thus, there is a need for a support for holding a digitizer cover, particularly the cover to a back-lighted digitizer tablet, which stably and automatically holds the cover open.

SUMMARY OF THE INVENTION

It is an object of the present invention to provide a digitizer tablet having a movable cover and a support for stably holding the cover open, particularly a back-lighted digitizer tablet.

It is another object of the present invention to provide such a support which automatically locks and stably holds the digitizer cover open.

It is another object of the invention to provide such a support which ma be housed within the digitizer tablet in its closed condition without requiring an increase in the size of the digitizer tablet to accommodate the support.

It is another object of the invention to provide a back-lighted digitizer tablet having a hinged cover and a support for holding the cover open to facilitate opening the digitizer tablet for gaining access to interior structure, particularly lighting apparatus, in the tablet.

The present invention achieves the above and other objects by providing a digitizer tablet having a movable cover and a support which automatically stably holds the cover open when the cover is opened.

A digitizer tablet according to the invention comprises a cover, a base structure, means pivotably connecting the cover and the base structure such that the cover may be pivoted relative to the base structure between a closed position in which the cover and the base structure define an enclosure substantially closed on all sides and an open position in which access is provided to portions of the digitizer tablet which are enclosed in the closed position of the digitizer tablet, and a support coupled to the cover and to the base structure for automatically holding the cover open when it has been pivoted to the open position.

Preferably, the support is constructed to automatically self engage in the open position of the cover and stably hold the cover open such that the application of a substantial force to the support is required to move the cover from the open position. Preferably, the support includes means resiliently urging the support to automatically self-engage in the open position, the resilience of the urging means having to be overcome to move the cover from the open position.

In a specific embodiment, the support comprises a first support arm pivotally connected at one end to the cover and a second support arm pivotally connected at one end to the base structure, the first and second support arms each including an opposite end which are pivoted together. The first and second support arms are pivoted to the cover and the base structure such that in the closed position of the cover the support arms are folded adjacent each other, and in the open position of the cover they are extended relative to each other.

In a preferred embodiment, the first and second support arms each comprise a web and opposed flanges connected thereto, i.e., a U or C-channel structure, the webs of the first and second arms being of different widths such that the first and second arms may be nested, the first and second support arms being pivoted to the cover and the base structure such that in the closed position of the cover the support arms are nested one substantially in the other, and in the open position of the cover they are extended relative to each other.

The cover, once opened, is automatically held open by self engagement of the arms. In one embodiment, self engagement is achieved by the configuration of the arms and by means limiting pivoting of the first and second arms relative to each other to a predetermined angle beyond a straight angle that the first and second arms form when the cover is opened. In a specific embodiment, the limiting means comprises a stop associated with the first and second arms which permits the first and second arms to be pivoted relative to each other through the straight angle relationship thereof. In other words, the limiting means and the first and second arms cooperate to permit a limited reversal of a flexion angle between the first and second arms and self engagement thereafter. In another specific embodiment, the support includes spring means which automatically urge the arms into the self-engaging position once the cover is opened. Appropriate spring means enable the cover to be opened while the tablet is disposed at an angle with the horizontal substantially up to 90°, i.e., in positions of the digitizer tablet from horizontal to substantially vertical.

In both embodiments for automatically holding the cover open, a substantial force must be applied to disengage the arms and reverse move them to close the cover, thus protecting against accidental closing of the cover.

If desired, a positive locking device may be provided which selectively positively locks the arms in the open position of the cover and prevents reverse movement of the arms after the arms have been moved into their self-engaging position.

In a preferred embodiment, the support comprises first and second supports, each comprising a first and second support arms connected as described above at opposite sides of the tablet. The support preferably includes means, for example, a tie rod, coupled to the first and second supports for synchronizing operation thereof. Conveniently, the support includes a tie rod which can be grasped to simultaneously unlock the first and second supports and gently lower the cover towards the base structure. Similarly, the tie rod may be grasped to complete the opening operation and synchronize locking of the first and second supports. The tie rod is conveniently spaced above the base structure so that it may be easily grasped.

In the preferred embodiment, the digitizer is back lighted and includes a grid or electrode structure secured to the cover and lighting apparatus secured to the base structure, the grid structure and the cover permitting light to pass therethrough to a top surface of the cover.

While description herein of the invention is primarily made with respect to a back-lighted digitizer tablet, it is not intended to limit the invention only to back-lighted digitizer tablets, and the invention is applicable to any digitizer tablet having a cover which may be moved relative to a base structure of the tablet.

The above and other objects, aspects, features and advantages of the invention will be more readily perceived from the description of the preferred embodiments thereof taken in conjunction with the accompanying drawings and appended claims.

BRIEF DESCRIPTION OF THE DRAWINGS

The invention is illustrated by way of example and not limitation in the figures of the accompanying drawings in which like references denote the same or corresponding parts, and in which:

FIG. 1 is a partially cut-away perspective view, partially in section, of a back-lighted digitizer tablet incorporating the present invention showing the cover of the digitizer tablet in a closed position;

FIG. 4 is a side view of a digitizer tablet incorporating another embodiment of the invention, showing the cover in an open and held position thereof, and in phantom showing the cover in an open and unsecured condition thereof; and FIG. 5 is an enlarged sectional view taken through a pivot joint of support arms of a support according to the invention for the cover of the digitizer tablet of FIG. 1.

DESCRIPTION OF THE PREFERRED EMBODIMENTS

Figure 2:
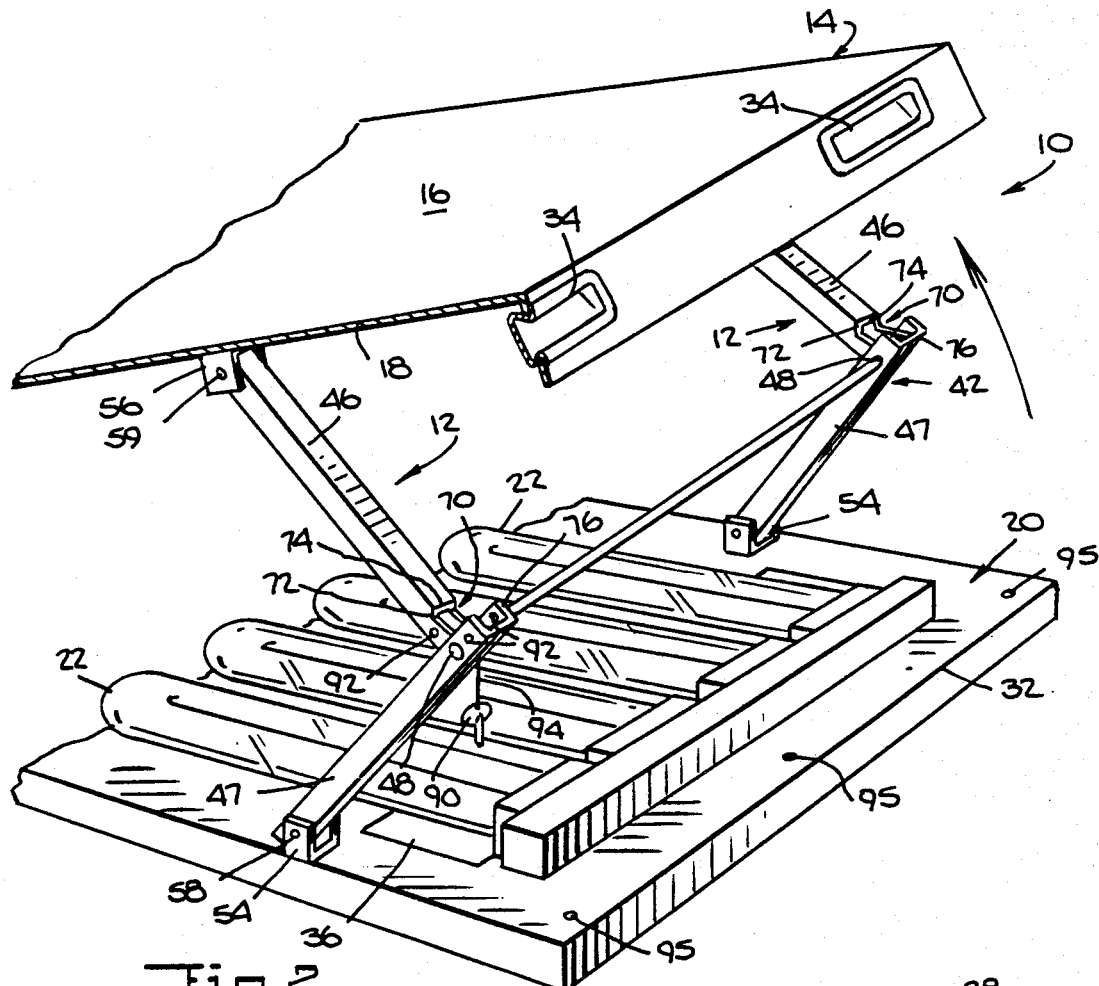
FIG. 2 is a partially cut-away perspective view, partially in section, of the digitizer tablet depicted in FIG. 1 showing the cover in an open and unsecured condition.

Referring to FIGS. 1 and 2, a back-lighted digitizer tablet 10 incorporates a cover support 12 in accordance with the invention. Digitizer tablet 10 comprises a cover 14 which includes digitizing surface 16. The grid or electrode structure (not shown) is disposed below surface 16 in a translucent plastic and/or glass laminate structure 18. Cover 14 may also include the digitizer circuitry (not shown) described above. The grid or electrode structure in the laminate structure 18 interacts with a cursor or stylus (not shown) as described above. The term "cover" is used herein in a broad sense and may simply be a cover in the usual sense of the word for a digitizer structure, i.e., it performs a covering, closing, enclosing, etc., function, or it may include structure of the type describe above.

Figure 3:
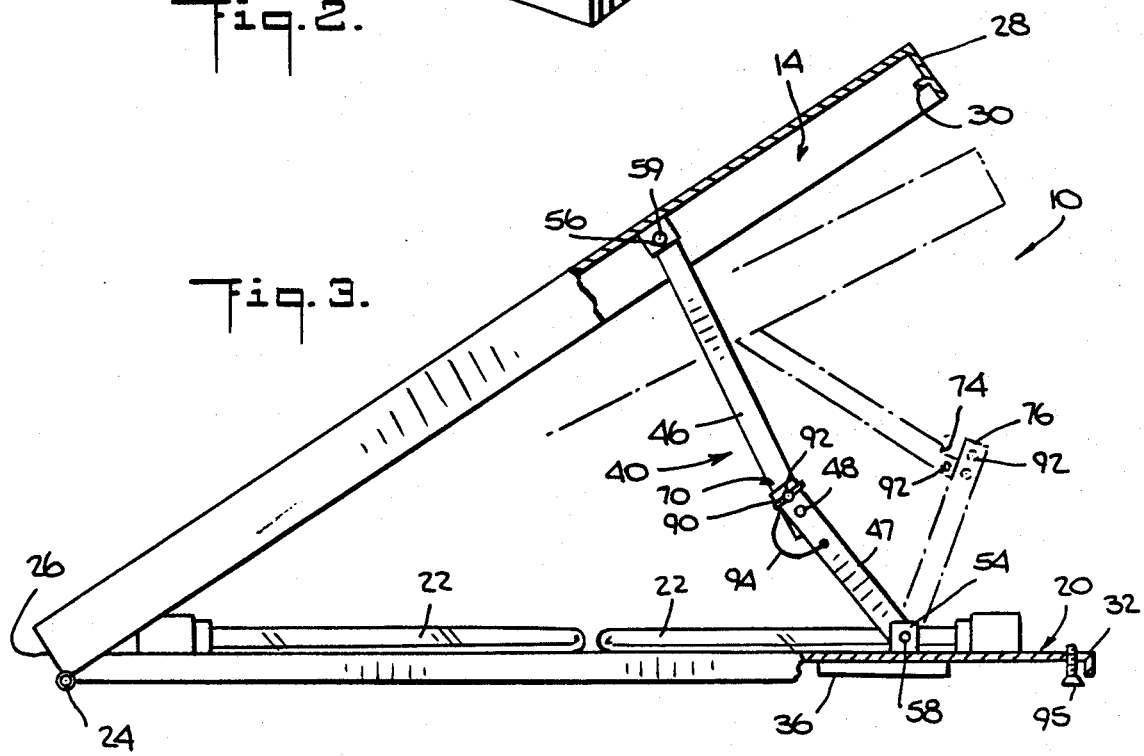
FIG. 3 is a side view of the digitizer tablet of FIG. 1 showing the cover in an open and held position, also showing in phantom the cover in an open and unsecured condition.

Digitizer tablet 10 also includes a base structure 20 which supports a series of U-shaped fluorescent lamps 22 that extend alternatingly from opposite sides of base structure 20, as shown in FIG. 3. A hinge 24 disposed at an end 26 of cover 14 pivotally connects cover 14 to base structure 20. End 28 of cover 14 (opposite end 26) is provided with an internal lip 30 which rests on the corresponding edge 32 of base structure 20. Recessed handles 34 (FIG. 2) are provided on the outside of cover end 28 for grasping cover 14 to open it. A fan 36 may be provided at each corner of base structure 20 for cooling lamps 22.

Support 12 includes a first support 40 and a second support 42 each pivoted to cover 14 and base structure 20. Each support 40, 42 include a first arm 46 pivoted at one end to cover 14, a second arm 47 pivoted at one end to base structure 20 and a pivot joint 48 pivotably coupling together the opposite end of each of first and second arms 46, 47. A bracket 54 connected to base structure 20 pivotally couples each second arm 47 to base structure 20, and a bracket 56 pivotally couples each first support arm 46 to cover 14. Pivot joints 58, 59 couple the respective arm to the respective bracket. Pivot joints 48, 58 and 59 may be simple pivots, i.e, each including a pivot pin 60 passing through registered holes 61 in the respective arm members, as depicted in FIG. 5. Brackets 56 and 58 may be secured to cover 14 and base structure 20 by any convenient structure such as fasteners, adhesives, welds, etc.

Arms 46, 47 each are formed as C-channels having a web 64 (FIG. 5) and opposed flanges 65. The C-channels for first arm 46 and second arm 47 are reversed, i.e. the webs of the respective arms face in opposite directions. Additionally, the webs of the two arms are of different widths so that when the arms are folded on each other as depicted in FIG. 5, they nest.

Referring to FIG. 2, first and second arms 46, 47 at respective ends thereof that are pivoted together are configured to form a stop 70 beyond which the arms may not be pivoted relative to each other. Structure defining this stop 70 includes a portion 72 of first arm 46 which does not include a web 64, so as to form a shoulder 74 at the edge of web 64. This shoulder 74 engages the end 76 of arm 47 to form a stop. Arm portion 72 without the web has a length which is approximately the same as the distance between pivot 48 and the end 76 of arm 47. This permits the first and second arms to be pivoted through a straight angle relationship in which the flexion angle between the arms is reversed, the extent to which arms 46, 47 may be pivoted depending upon the relative lengths of first and second arms 46, 47 and the length of arm portion 72 without a web. As depicted in FIG. 3, the length of arm portion 72 is slightly longer than the distance between pivot 48 and the end 76 of second arm 47 so that the first and second arms may pivot through a 180° relationship from a forward flexion angle relationship depicted in phantom in FIG. 3 into the reverse flexion angle relationship depicted in solid lines in FIG. 3. In that reverse flexion angle relationship of the arms, end 76 of second arm 47 engages shoulder 74 formed by web 64 of first arm 47 to form the stop. Thus, when cover 14 is lifted to pivot the first and second arms through 180° into a reverse flexion angle relationship, the two arms self engage and prevent the cover from pivoting further, thereby automatically holding the cover 14 in the open position.

The weight of cover 14 is transmitted through upper arms 46 to lower arms 47, and a force must be applied to support 12 sufficient to overcome the weight of cover 14 to reverse pivot arms 46, 47 past a 180° alignment thereof, at which time cover 14 may be moved, or even fall due to gravity. Thus, a substantial force is required to disengage first and second arms 46, 47 to close cover 14. This force is sufficiently great to effectively preclude accidental falling of cover 14 from jarring, etc. The relative lengths of arms 46 and 47 and the length of arm potion 72 determine the extent of self engagement of arms 46, 47, i.e., the stability of support 12 in holding cover 14 open. Making arms 46 longer than arm 47 facilitates self engagement and provides a relatively stable support which requires a substantial force to disengage the arms and close cover 14.

As depicted in FIGS. 4 and 5, a torsion spring 80 may be wound on the pivots 48 of arms 46, 47 with the ends 82, 83 of spring 80 engaging a web 64 of a respective arm. Spring 80 is wound so as to urge arms 46, 47 into their self-engaging position when cover 14 is pivoted open. Appropriate selection of spring 80 enables cover 14 to be opened when digitizer tablet 10 is at almost any angle between the horizontal and the vertical. To disengage arms 46 and 47, the torsion of spring 80 must be overcome in addition to the weight of cover 14, as described above. Spring 80 may also function as a counter balance after arms 46 and 47 have been pivoted past the 180° aligned relationship thereof.

In an embodiment which includes torsion spring 80, the relative lengths of the arms may vary, and first arm 46 need not be longer than second arm 47 to obtain a stable and relatively effective engagement of arms 46 and 47.

Arms 46, 47 may positively be locked in their selfengaging position by lock pin 90 (FIG. 2) inserted through registered holes 92 in one or both pairs of arms 46 and 47. Lock pin 90 is secured to arm 47 by chain or cord 94. Cover 14 may be locked in its closed position by captivated screws 95.

To synchronize engaging and disengaging of first and second arms 46, 47 into and from their self-engaging position, a tie rod 96 is connected to second arms 47 at or adjacent pivot 48. Tie rod 96 may be grasped to initiate closing of the cover and disengaging of the support arms. Preferably, tie rod 96 is connected to both first arms 46 and second arms 47 and constitutes the pivot pin of pivot joints 48 for the respective pairs of arms.

Referring to FIG. 4, support 40A and the opposite support (not shown) each includes a stop 70A which differs from stop 70 depicted in FIGS. 2 and 3. Stop 70A includes an extended web portion 98 at the end of arm 47A that is pivoted to arm 46A. In the self-engaging condition of arms 46A and 47A, web portion 98 of arm 47A engages web 62A of arm 46A to limit pivoting of arms 46A, 47A as described for arms 46, 47.

Certain changes and modifications of the embodiments herein disclosed will be readily apparent to those of skill in the art. It is the applicant's intention to cover by the claims all such changes and modifications which could be made to the embodiments herein chosen for purposes of disclosure which do not depart from the spirit and scope of the invention.

I claim:

1. A digitizer tablet comprising a cover, a base structure, means pivotably connecting said cover and said base structure such that said cover may be pivoted relative to said base structure between a closed position in which said cover and said base structure define an enclosure substantially closed on all sides and an open position in which access is provided to portions of said digitizer tablet which are enclosed in the closed position of said digitizer tablet, and a support coupled to said cover and to said base structure for automatically locking and holding said cover open in said open position when said cover has been pivoted to said open position, said support being constructed such that when locked in said open position said support must be unlocked to allow a closing movement of said cover.

2. The digitizer tablet of claim 1 wherein said support is constructed to lock by self-engagement when said cover is moved to said open position and such that a substantial force must be applied to said support to disengage said support and permit said cover to be moved from said open position to said closed position.

3. The digitizer of claim 2 including means resiliently urging said support to self engage and lock in said open position, the resilience of said urging means having to be overcome to disengage said support in said open position.

4. The digitizer of claim 1 wherein said support comprises a first support arm pivotally connected at one end to said cover and a second support arm pivotally connected at one end to said base structure, said first and second support arms each including an opposite end which are pivoted together.

5. The digitizer of claim 4 wherein said first and second support arms are pivoted to said cover and said base structure such that in said closed position of said cover said support arms are folded adjacent each other, and in said open position of said cover they are extended relative to each other.

6. The digitizer of claim 5 wherein said support includes means limiting pivoting of said first and second arms relative to each other to a predetermined angle after said first and second arms form a straight angle as they are extended as said cover is moved to said open position.

7. The digitizer of claim 5 wherein said first and second support arms each comprise a web and opposed flanges connected thereto, the webs of said first and second arms being of different widths such that said first and second arms may be nested, said first and second support arms being pivoted to said cover and said base structure such that in said closed position of said cover said support arms are nested one substantially in the other, and in said open position of said cover they are extended relative to each other.

8. The digitizer tablet of claim 4 wherein said first and second arms are constructed and connected to each other and to said cover and said base structure to positively lock by self-engagement when said cover is moved to said open position and such that a substantial force must be applied to said support to disengage said first and second arms and permit said cover to be moved from said open position to said closed position.

9. The digitizer of claim 1 wherein said support comprises first and second supports, each comprising a first support arm pivotally connected at one end to said cover and a second support arm pivotally connected at one end to said base structure, said first and second support arms each including an opposite end which are pivoted together, said first support being coupled to said digitizer tablet adjacent one side thereof and said second support being coupled to said digitizer tablet adjacent a side thereof opposite said one side.

10. The digitizer of claim 9 including means coupled to said first and second supports for synchronizing locking, unlocking and movement thereof.

11. The digitizer according to claim 10 wherein said synchronizing means comprises a rod coupled to said first and second supports adjacent said opposite ends of respective first and second arms.

12. The digitizer of claim 1 wherein said means pivotably connecting said cover and said base structure comprises a hinge connecting said cover and said base structure together along one edge of said digitizer.

13. The digitizer of claim 1 wherein said digitizer is back lighted and includes a grid or electrode structure secured to said cover and lighting apparatus secured to said base structure, said grid structure and said cover permitting light to pass therethrough to a top surface of said cover.

14. A digitizer tablet comprising a cover, a base structure, means pivotably connecting said cover and said base structure such that said cover may be pivoted relative to said base structure between a closed position in which said cover and said base structure define an enclosure substantially closed on all sides and an open position in which access is provided to portions of said digitizer tablet which are enclosed in the closed position of said cover, and a support coupled to said cover and to said base structure for automatically holding said cover open when it has been pivoted to said open position, said support comprising a first support arm pivotally connected at one end to said cover and a second support arm pivotally connected at one end to said base structure, said first and second support arms each including an opposite end which are pivoted together, said first and second arms being pivoted to said cover and said base structure such that in said closed position of said cover said support arms are folded adjacent each other, and in said open position of said cover they are extended relative to each other, said first and second arms being structured and connected together and to said base structure and said cover to automatically lock and hold said cover in said open position when it has been pivoted thereto and such that when said first and second arms are locked in said open position of said cover, they must be unlocked to allow a closing movement of said cover.

15. The digitizer of claim 14 including means resiliently urging said first and second support arms to self engage and lock in said open position, the resilience of said urging means having to be overcome to disengage said first and second support arms in said open position.

16. The digitizer of claim 14 wherein said first arm is longer than said second arm and said support includes means limiting pivoting of said first and second arms relative to each other to a predetermined angle after said first and second arms form a straight angle as they are extended when said cover is opened.

17. The digitizer of claim 14 wherein said first and second support arms each comprise a web and opposed flanges connected thereto, the webs of said first and second arms being of different widths such that said first and second arms may be nested, said first and second support arms being pivoted to said cover and said base structure such that in said closed position of said cover said support arms are nested one substantially in the other, and in said open position of said cover they are extended relative to each other.

18. The digitizer of claim 14 wherein said support comprises first and second supports, each comprising a said first support arm pivotally connected at one end to said cover and a said second support arm pivotally connected at one end to said base structure and pivoted together at said opposite ends thereof, said first support being coupled to said digitizer tablet adjacent one side thereof and said second support being coupled to 19. The digitizer of claim 18 including means coupled to said first and second supports for synchronizing locking, unlocking and movement thereof.

20. The digitizer according to claim 19 wherein said synchronizing means comprises a rod coupled to said first and second supports adjacent said opposites ends of respective first and second arms.

21. The digitizer of claim 14 wherein said means pivotably connecting said cover and said base structure comprises a hinge connecting said cover and said base structure together along one edge of said digitizer.

22. The digitizer of claim 14 wherein said digitizer is back lighted and includes a grid or electrode structure secured to said cover and lighting apparatus secured to said base structure, said grid structure and said cover permitting light to pass therethrough to a top surface of said cover.

* * * * *

UNITED STATES PATENT AND TRADEMARK OFFICE
CERTIFICATE OF CORRECTION

PATENT NO. : 4,985,602

DATED : January 15, 1991

INVENTOR(S) : Kenneth Kouhia

It is certified that error appears in the above-identified patent and that said Letters Patent is hereby corrected as shown below:

Column 8, line 44, after "coupled to" add --said digitizer tablet adjacent a side thereof opposite said one side.--.

Signed and Sealed this

Twenty-second Day of December, 1992

*Attest:*

DOUGLAS B. COMER

*Attesting Officer*   Acting Commissioner of Patents and Trademarks